United States Patent
Pandian

(10) Patent No.: US 11,987,371 B2
(45) Date of Patent: May 21, 2024

(54) DRIVE-THROUGH FRICTION CLUTCH AS A TENSILE LOAD DISCONNECT

(71) Applicant: Hamilton Sundstrand Corporation, Charlotte, NC (US)

(72) Inventor: Navaneethakrishnan Pandian, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 198 days.

(21) Appl. No.: 17/524,660

(22) Filed: Nov. 11, 2021

(65) Prior Publication Data

US 2023/0078972 A1    Mar. 16, 2023

(30) Foreign Application Priority Data

Sep. 16, 2021  (IN) .............................. 202111041969

(51) Int. Cl.
  *B64D 29/06*  (2006.01)
  *B64D 29/08*  (2006.01)
  *F15B 15/26*  (2006.01)

(52) U.S. Cl.
  CPC ............. *B64D 29/06* (2013.01); *B64D 29/08* (2013.01); *F15B 15/26* (2013.01)

(58) Field of Classification Search
  CPC ......... F16H 25/2454; F16H 2025/2071; F16H 25/2021; F16H 25/2015; B64D 29/06; B64D 29/08
  See application file for complete search history.

(56) References Cited

U.S. PATENT DOCUMENTS

| 8,450,894 | B2 | 5/2013 | Blanding et al. |
| 9,701,414 | B2 | 7/2017 | Vaughan et al. |
| 10,626,890 | B2 | 4/2020 | Burghdoff et al. |
| 10,626,980 | B2 * | 4/2020 | Rosengren ............. F16H 25/20 |
| 10,787,841 | B2 | 9/2020 | Dyer et al. |
| 10,816,070 | B2 | 10/2020 | Lagger et al. |
| 11,015,686 | B2 * | 5/2021 | Lu ....................... F16H 25/2454 |
| 11,054,005 | B2 | 7/2021 | Burghdoff et al. |
| 11,067,156 | B1 | 7/2021 | Heiberger et al. |
| 11,473,656 | B2 * | 10/2022 | Lin ........................ F16H 57/02 |

(Continued)

FOREIGN PATENT DOCUMENTS

JP    2013130286 A    7/2013

OTHER PUBLICATIONS

"How it Works: Mechanical Friction Torque Limiter—Mach III", (Sep. 23, 2020), XP093018288, Retrieved from the Internet <URL: https://www.machiii.com/resources/how-our-products-work/how-it-works-mechanical-friction-torque-limiter> [retrieved on Jan. 27, 2023] 1 page.

(Continued)

*Primary Examiner* — Gregory Robert Weber
(74) *Attorney, Agent, or Firm* — CANTOR COLBURN LLP

(57) ABSTRACT

An actuator assembly for a cowl door is provided. The actuator assembly includes a housing, an actuator configured to drive cowl door extension and cowl door retraction and to support the cowl door during the cowl door extension and the cowl door retraction and a clutch assembly interposed between the actuator and the housing. The clutch assembly is configured to engage a capability of the actuator to drive the cowl door retraction when the cowl door loads the actuator.

14 Claims, 3 Drawing Sheets

(56) References Cited

U.S. PATENT DOCUMENTS

| | | |
|---|---|---|
| 2003/0192987 A1 | 10/2003 | Ahrendt et al. |
| 2005/0040284 A1 | 2/2005 | Christensen et al. |
| 2007/0144846 A1 | 6/2007 | Bucheton et al. |
| 2015/0267724 A1 | 9/2015 | Dyer et al. |
| 2019/0135447 A1* | 5/2019 | John .................. F16H 25/2204 |
| 2020/0063481 A1 | 2/2020 | Bouman |
| 2021/0071461 A1 | 3/2021 | Pandian |

OTHER PUBLICATIONS

European Search Report issued in European Patent Application No. 22195595.8; Application Filing Date Sep. 14, 2022; dated Feb. 6, 2023 (15 pages).

* cited by examiner

DRIVE-THROUGH FRICTION CLUTCH AS A TENSILE LOAD DISCONNECT

CROSS-REFERENCE TO RELATED APPLICATIONS

This application claims the benefit of Indian Application No. 202111041969 filed Sep. 16, 2021, the disclosure of which is incorporated herein by reference in its entirety.

BACKGROUND

The present disclosure relates to engine cowls and, more particularly, to a drive-through friction clutch as a tensile load disconnect for use in an engine cowl.

Aircraft engine cowls are used to allow aircraft engines to be serviced and can be fully opened by actuators and kept in the open position until a maintenance operation is completed, at which time they are closed. Hydraulic actuators are generally used for this purpose. Cowl doors are opened by fluid being supplied to the hydraulic actuators and the cowl doors are allowed to retract at a controlled rate under the weight of the cowl doors (i.e., the cowl load). Cowl loads are thus always compressive loads with respect to the hydraulic actuators. When the cowl doors are opened, hold-open-rods (HORs) are manually engaged and the hydraulic actuators are slightly retracted under the cowl load. During retraction, the cowl load is transferred onto the HOR thus relieving the hydraulic actuator of the load. Then, with no cowl load on the hydraulic actuator, the retraction halts and the hydraulic actuators act as secondary load path members.

Electro-mechanical actuators can replace existing hydraulic actuators and could be designed to power both extension and retraction operations. In such an architecture, after the extension sequence, when the cowl load is transferred to the HOR, the operator can continue to command the actuator to retract.

BRIEF DESCRIPTION

According to an aspect of the disclosure, an actuator assembly for a cowl door is provided. The actuator assembly includes a housing, an actuator configured to drive cowl door extension and cowl door retraction and to support the cowl door during the cowl door extension and the cowl door retraction and a clutch assembly interposed between the actuator and the housing. The clutch assembly is configured to engage a capability of the actuator to drive the cowl door retraction when the cowl door loads the actuator.

In accordance with additional or alternative embodiments, the actuator includes an electro-mechanical (EM) actuator.

In accordance with additional or alternative embodiments, the actuator assembly further includes a motor and a gear to drive operations of the actuator.

In accordance with additional or alternative embodiments, the actuator includes a sleeve coupled with the cowl door and including first and second bearing supports, a nut including a flange for engagement with the first bearing supports to drive cowl door extension and with the second bearing supports to drive cowl door retraction and a screw shaft on which the nut is threadably engaged. The screw shaft is rotatable to drive the nut such that the flange engages with the first or second bearing supports, respectively, to drive the cowl door extension or the cowl door retraction, respectively.

In accordance with additional or alternative embodiments, the sleeve is externally threaded and the nut is internally threaded.

In accordance with additional or alternative embodiments, one or more sliding fit joints are supportively interposed between the housing and the sleeve.

In accordance with additional or alternative embodiments, a hold-open-rod (HOR) supports the cowl door once the cowl door is at least partially extended.

In accordance with additional or alternative embodiments, the cowl door is opened by the actuator driving the cowl door extension. The HOR is manually engaged and the actuator drives the cowl door retraction until the HOR supports the cowl door.

In accordance with additional or alternative embodiments, the clutch assembly is configured such that a capability of the actuator to drive the cowl door retraction when the HOR supports the cowl door is limited to a preload level of the clutch assembly.

In accordance with additional or alternative embodiments, the clutch assembly includes a gear, a friction disc pack interposed between the gear and a screw shaft of the actuator and an elastic element interposed between the gear and the housing. When the cowl door loads the actuator, the gear impinges against the housing and, when the cowl door does not load the actuator, the elastic element forms a gap between the gear and the housing.

According to an aspect of the disclosure, an actuator assembly for a cowl door is provided. The actuator assembly includes a housing, an actuator that incudes a sleeve coupled with the cowl door and comprising first and second bearing supports, a nut including a flange for engagement with the first bearing supports to drive cowl door extension and with the second bearing supports to drive cowl door retraction and a screw shaft on which the nut is threadably engaged, the screw shaft being rotatable to drive the nut such that the flange engages with the first or second bearing supports, respectively, to drive the cowl door extension or the cowl door retraction, respectively, and a clutch assembly interposed between the actuator and the housing and configured to engage a capability of the actuator to drive the cowl door retraction when the cowl door loads the actuator.

In accordance with additional or alternative embodiments, the actuator includes an electro-mechanical (EM) actuator.

In accordance with additional or alternative embodiments, the actuator assembly further includes a motor and a gear to drive operations of the actuator.

In accordance with additional or alternative embodiments, the sleeve is externally threaded and the nut is internally threaded.

In accordance with additional or alternative embodiments, one or more sliding fit joints are supportively interposed between the housing and the sleeve.

In accordance with additional or alternative embodiments, a hold-open-rod (HOR) supports the cowl door once the cowl door is at least partially extended.

In accordance with additional or alternative embodiments, the cowl door is opened by the actuator driving the cowl door extension, the HOR is manually engaged and the actuator drives the cowl door retraction until the HOR supports the cowl door.

In accordance with additional or alternative embodiments, the clutch assembly is configured such that a capability of the actuator to drive the cowl door retraction when the HOR supports the cowl door is limited to a preload level of the clutch assembly.

In accordance with additional or alternative embodiments, the clutch assembly includes a gear, a friction disc pack interposed between the gear and the screw shaft and an elastic element interposed between the gear and the housing. When the cowl door loads the actuator, the gear impinges against the housing and, when the cowl door does not load the actuator, the elastic element forms a gap between the gear and the housing.

According to an aspect of the disclosure, a method of operating an actuator assembly of a cowl door is provided. The method includes activating an actuator to drive cowl door extension, engaging a hold-open-rod (HOR), activating the actuator to drive cowl door retraction until the cowl door is supported by the HOR and reducing a capability of the actuator to drive the cowl door retraction when the cowl door is supported by the HOR.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
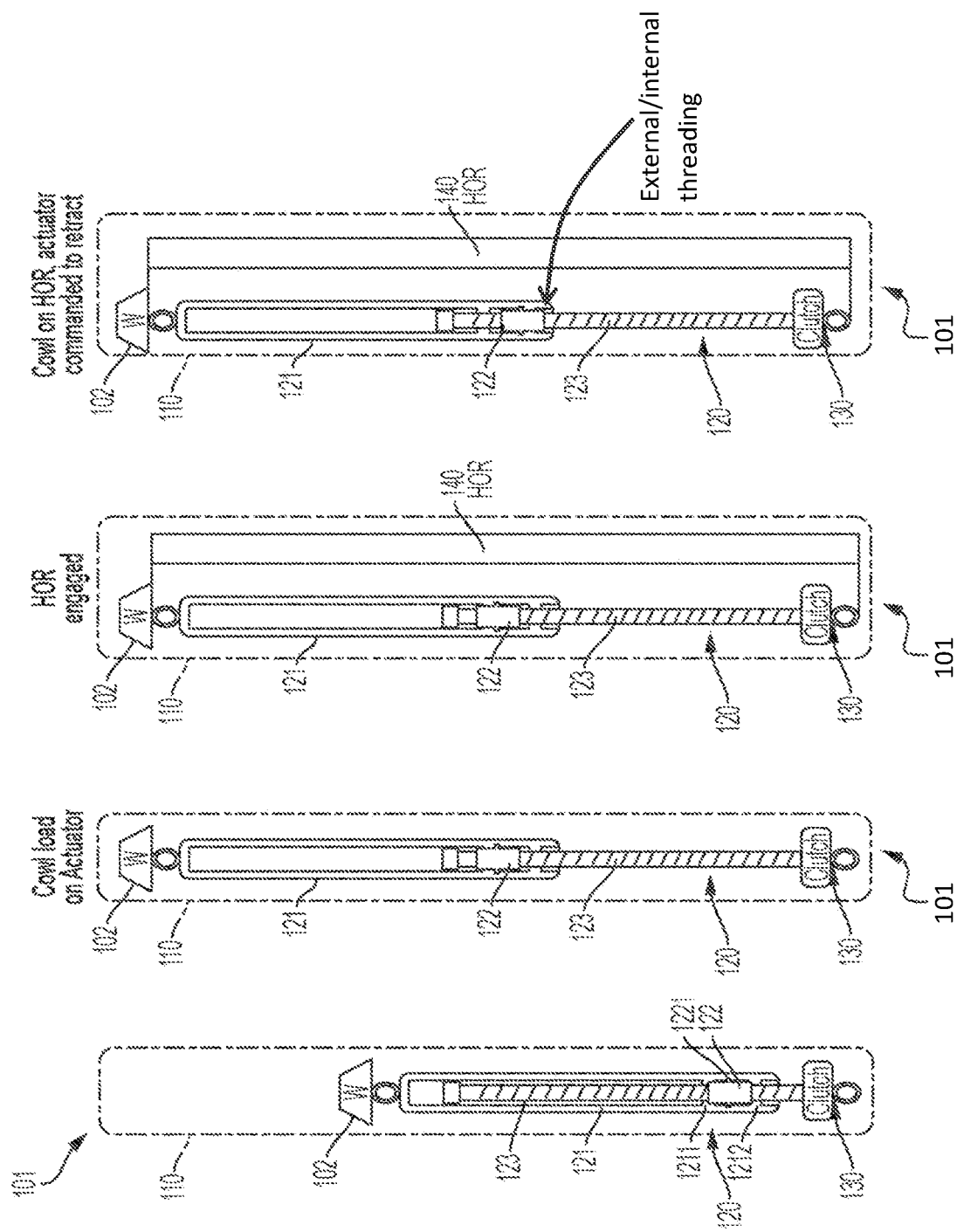
FIGS. 1A, 1B, 1C and 1D are schematic illustrations of operations of an actuator assembly for a cowl door in accordance with embodiments.

With a cowl door rested on an HOR after the cowl door is opened and the HOR is manually engaged, an electromechanical (EM) actuator can continue to retract automatically or on command. This could forcibly pull the HOR-restrained cowl door towards closure. As a result, the EM actuator could exert a stall load onto the cowl door which will be transferred to the HOR. Thus, the HOR needs to be sized to be sized to be robust against the cowl load and the additional load generated by the EM actuator.

As will be described below, a cowl door assembly is provided with a gain-based friction disc clutch that drives the actuator when compressive load exists. When the load is moved off and onto an HOR, the actuator capability is limited to a preload on a clutch pack. This results in reduced axial load capability of actuator which in turn results in reduced compressive force being applied by the cowl door onto the HOR. The HOR can therefore be reduced in sized as it no longer needs to be capable of bearing the weight of the cowl door and the additional load generated by the actuator.

With reference to FIGS. 1A, 1B, 1C and 1D, an actuator assembly 101 is provided for driving an extension of a cowl door 102, for driving a retraction of the cowl door 102 and for supporting a weight of the cowl door 102 during the extension and the retraction of the cowl door 102.

As shown in FIGS. 1A, 1B, 1C and 1D, the actuator assembly 101 includes a housing 110, an actuator 120, a clutch assembly 130 and an HOR 140. The actuator 120 includes a sleeve 121, a nut 122 and a screw shaft 123. The sleeve 121 is coupled with the cowl door 102. The sleeve 121 includes first bearing supports 1211 that are proximate to the cowl door 102 and second bearing supports 1212 that are remote from the cowl door 102. The nut 122 is internally threaded and includes a flange 1221 that is disposed for engagement with the first bearing supports 1211 to drive an extension of the cowl door 102 and with the second bearing supports 1212 to drive a retraction of the cowl door 102. The screw shaft 123 is externally threaded and the nut 122 can be threadably engaged with the screw shaft 123. The screw shaft 123 is rotatable relative to the housing 110, the cowl door 102 and the sleeve 121 to drive the nut 122 in an extension direction or a retraction direction. When the screw shaft 123 is rotated such that the nut 122 is driven in the extension direction, the flange 1221 engages with the first bearing supports 1211 to drive the sleeve 121 in the extension direction and thus to drive the extension of the cowl door 102. Conversely, when the screw shaft 123 is rotated such that the nut 122 is drive in the retraction direction, the flange 1221 engages with the second bearing supports 1212 to drive the sleeve 121 in the retraction direction and thus to drive the retraction of the cowl door 102. The clutch assembly 130 is interposed between the actuator 120 and the housing 110. The clutch assembly 130 is configured to engage a capability of the actuator 120 to drive the retraction of the cowl door 102 when the cowl door 102 compressively loads the actuator 120.

The HOR 140 can be manually engaged to support the cowl door 102 once the cowl door 102 is at least partially extended by the actuator 120 or otherwise. That is, the cowl door 102 can be opened by the actuator 120 driving the extension of the cowl door 102, the HOR 140 being manually engaged and the actuator 120 subsequently driving the retraction of the cowl door 102 until the HOR 140 supports the cowl door 102 (about 2" of retraction). At this point, if the actuator 120 were to continue to drive retraction of the cowl door 102, the actuator 120 will be effectively prevented from doing so. This is because the clutch assembly 130 is configured such that a capability of the actuator 120 to drive the retraction of the cowl door 102 when the HOR 140 already supports the cowl door 102 is limited to a preload level of the clutch assembly 130.

A situation in which the actuator 120 is made to attempt to drive the retraction of the cowl door 102 when the HOR already supports the cowl door 102 can occur when an operator mistakenly commands the actuator 120 to retract the cowl door 102 while the HOR 140 is in place. In these or other cases, the clutch assembly 130 effectively reduces a capability of the actuator 120 to retract the cowl door 102. As a result, the HOR 140 can be sized to support the weight of the cowl door 102 but need not be sized to support the additional weight associated with the actuator 120 retracting the cowl door 102 onto the HOR 140. Thus, the HOR 140 can be reduced in size and weight, which can have an effect of reducing an overall size and weight of the corresponding engine nacelle.

Figure 2:
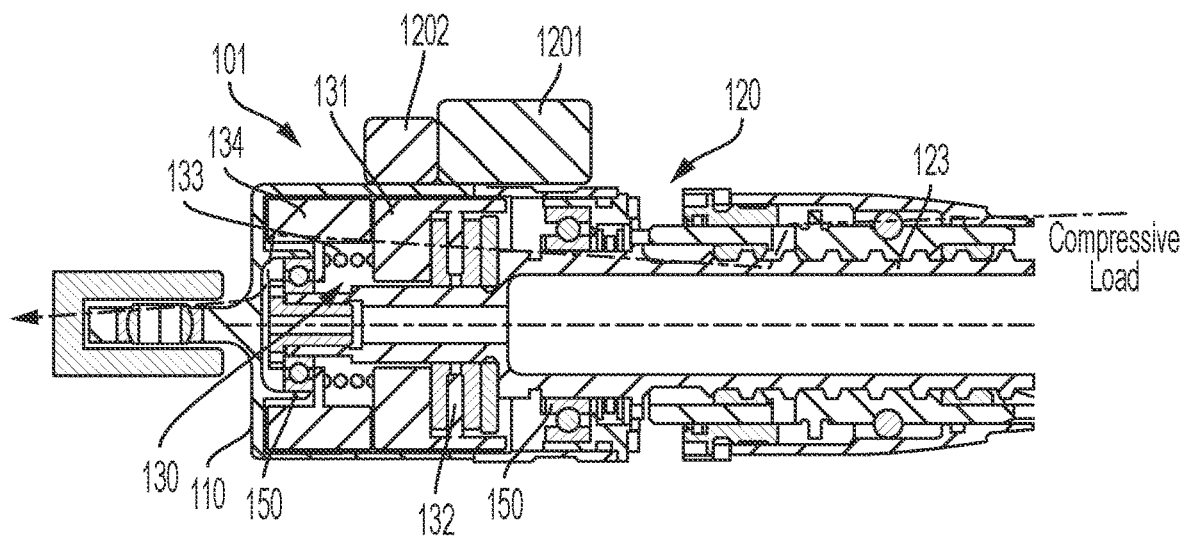
FIG. 2 is a side view of components of an actuator assembly under compressive loads in accordance with embodiments.
Figure 3:
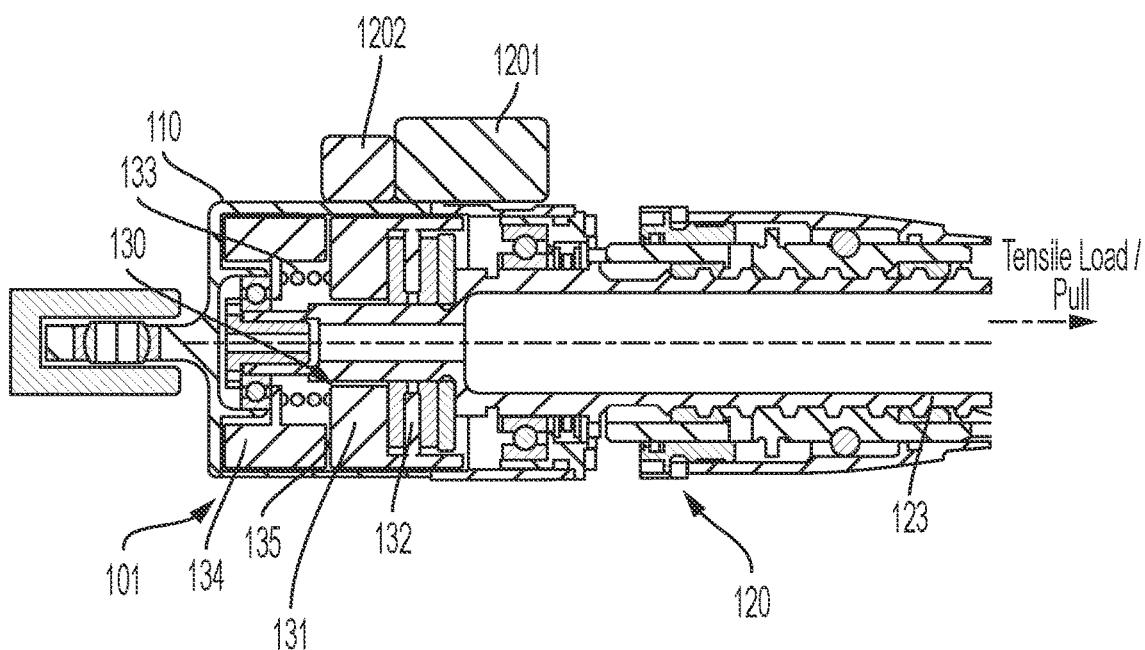
FIG. 3 is a side view of components of an actuator assembly under no compressive loads in accordance with embodiments.

With reference to FIGS. 2 and 3, further details of the actuator 120 and the clutch assembly 130 will now be described. As shown in FIGS. 2 and 3, the actuator 120 can include or be provided as an electro-mechanical (EM) actuator and the actuator 120 can include a motor 1201 and a gear 1202 to drive operations of the actuator 120. The actuator assembly 101 can further include one or more sliding fit joints 150 (see FIG. 2) that are supportively interposed between the housing 110 and the sleeve 121. The clutch assembly 130 includes a second gear 131, which can be coupled with or otherwise connected to the gear 1202, a friction disc pack 132 that is interposed between the second gear 131 and the screw shaft 123 and an elastic element 133, such as a preloaded spring, which is interposed between the second gear 131 and an insert feature 134 of the housing 110. When the cowl door 102 compressively loads the actuator 120, the second gear 131 impinges against the insert feature 134 of the housing 110. This permits the transmission of torque from the clutch assembly 130 to and through the actuator 120. Conversely, when the cowl door 102 does not compressively load the actuator 120, the elastic element 133 forms a gap 135 between the second gear 131 and the insert feature 134 of the housing 110 and no torque is transmitted from the clutch assembly 130 to the actuator 120.

Figure 4:
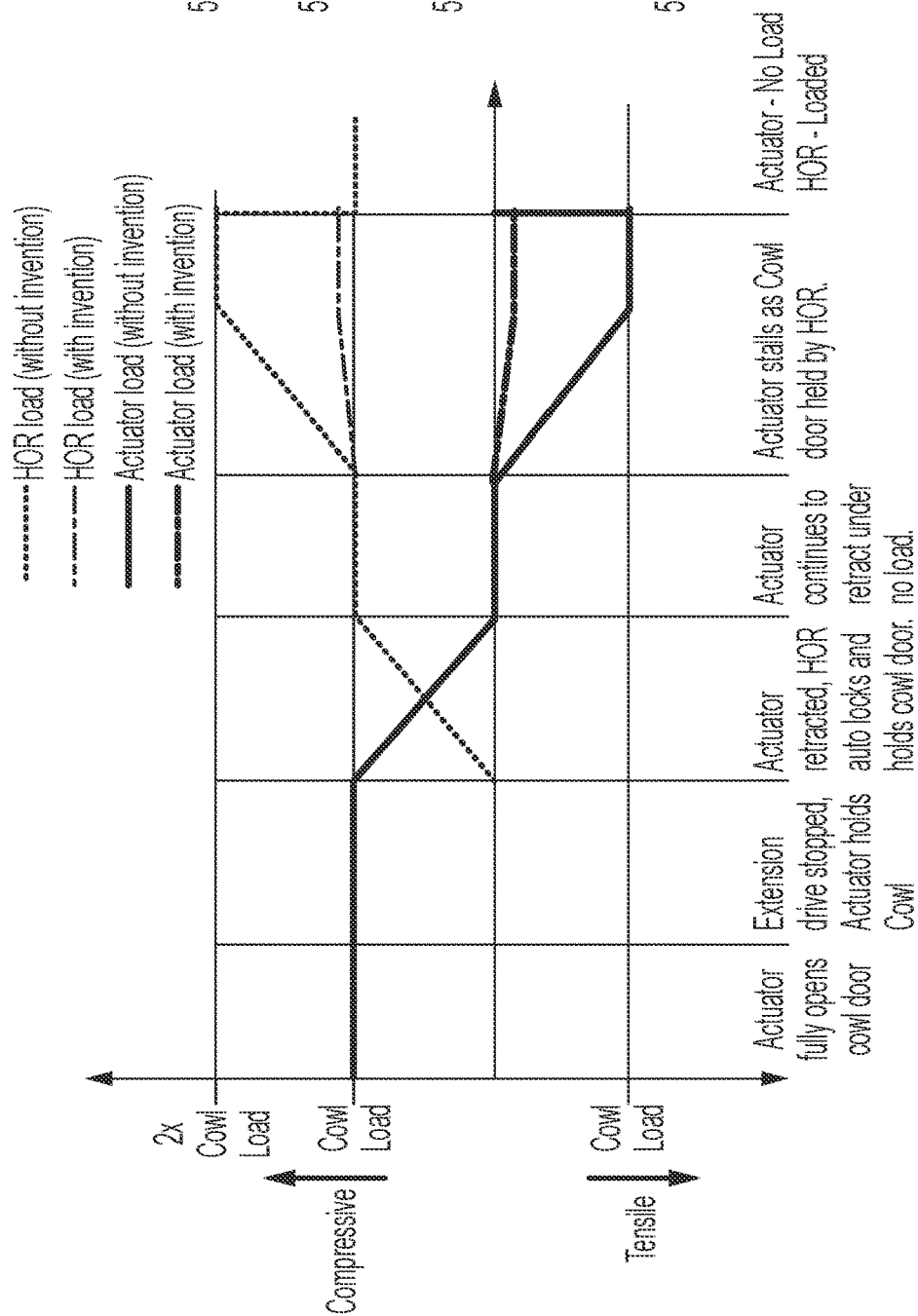
FIG. 4 is a graphical depiction of actuator and hold-open-rod loads over time in conventional cases and in cases in accordance with embodiments.

With reference to FIG. 4, it is apparent that actuator load is reduced as a result of the embodiments described herein and that, while a conventional actuator would stall once the cowl door 102 is supported by the HOR 140 in a case where the conventional actuator is commanded (mistakenly or otherwise) to continue to retract the cowl door 102 in a conventional assembly, the reduced load of the actuator 120 in the present invention avoids this result. As used herein, the term "stall" refers to the actuator 120 no longer translate because it is restrained by the cowl door 102 which in turn is held by the HOR 140.

Figure 5:
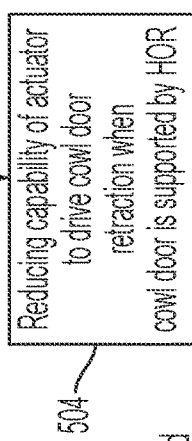
FIG. 5 is a flow diagram illustrating a method of operating an actuation assembly in accordance with embodiments.

With reference to FIG. 5, a method of operating an actuator assembly of a cowl door as described above is provided. As shown in FIG. 5, the method includes activating an actuator to drive cowl door extension (501), engaging an HOR manually or otherwise (502), activating the actuator to drive cowl door retraction until the cowl door is supported by the HOR (503) and reducing a capability of the actuator to drive the cowl door retraction when the cowl door is supported by the HOR (504).

Technical effects and benefits of the present disclosure are the provision of a cowl door assembly that eliminates the use of electronic intelligence to sense cowl or actuator position to override operator input and reduces an overall weight of a nacelle as HORS can be sized for cowl loads only.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. An actuator assembly for a cowl door, the actuator assembly comprising:
    a housing;
    an actuator configured to drive cowl door extension and cowl door retraction and to support the cowl door during the cowl door extension and the cowl door retraction;
    a motor and a gear to drive operations of the actuator; and
    a clutch assembly interposed between the actuator and the housing,
    wherein:
    the clutch assembly is configured to engage a capability of the actuator to drive the cowl door retraction when the cowl door loads the actuator and the motor drives the operations of the actuator,
    the capability of the actuator is a preload level of the clutch assembly,
    the actuator assembly further comprises a hold-open-rod (HOR) to support the cowl door once the cowl door is at least partially extended,
    the clutch assembly comprises a second gear, a friction disc pack interposed between the second gear and a screw shaft of the actuator and an elastic element interposed between the second gear and the housing, and,
    when the cowl door loads the actuator, the second gear impinges against the housing, and, when the cowl door does not load the actuator, the elastic element forms a gap between the second gear and the housing.

2. The actuator assembly according to claim 1, wherein the actuator comprises an electro-mechanical (EM) actuator.

3. The actuator according to claim 1, wherein the actuator comprises:
    a sleeve comprising a first support and a second support;
    a nut comprising a flange for engagement with the first support to drive cowl door extension and with the second support to drive cowl door retraction; and
    a screw shaft on which the nut is threadably engaged, the screw shaft being rotatable to drive the nut such that the flange engages with the first support or with the second support, respectively, to drive the cowl door extension or the cowl door retraction, respectively.

4. The actuator assembly according to claim 3, wherein the screw shaft is externally threaded and the nut is internally threaded.

5. The actuator assembly according to claim 3, further comprising one or more bearings supportively interposed between the housing and the screw shaft.

6. The actuator assembly according to claim 1, wherein the cowl door opens by the actuator driving the cowl door extension and the actuator drives the cowl door retraction until the HOR supports the cowl door.

7. The actuator assembly according to claim 1, wherein the clutch assembly is configured such that a capability of the actuator to drive the cowl door retraction when the HOR supports the cowl door is limited to a preload level of the clutch assembly.

8. A method of operating an actuator assembly for a cowl door according to claim 1, the method comprising:
    activating the actuator to drive the cowl door extension;
    engaging the HOR;
    activating the actuator to drive the cowl door retraction until the cowl door is supported by the HOR; and
    reducing the capability of the actuator to drive the cowl door retraction when the cowl door is supported by the HOR.

9. An actuator assembly for a cowl door, the actuator assembly comprising:
    a housing;
    an actuator; and
    a motor and a gear to drive operations of the actuator, wherein the actuator comprises:
    a sleeve and comprising a first support and a second support;
    a nut comprising a flange for engagement with the first support to drive cowl door extension and with the second support to drive cowl door retraction; and
    a screw shaft on which the nut is threadably engaged, the screw shaft being rotatable to drive the nut such that the flange engages with the first support or with the second support, respectively, to drive the cowl door extension or the cowl door retraction, respectively; and
    a clutch assembly interposed between the actuator and the housing and configured to engage a capability of the actuator to drive the cowl door retraction when the cowl door loads the actuator and the motor drives the operations of the actuator,
    wherein:
    the capability of the actuator is a preload level of the clutch assembly,
    the actuator assembly further comprises a hold-open-rod (HOR) to support the cowl door once the cowl door is at least partially extended,
    the clutch assembly comprises a second gear, a friction disc pack interposed between the second gear and the screw shaft and an elastic element interposed between the second gear and the housing, and,
    when the cowl door loads the actuator, the second gear impinges against the housing, and, when the cowl door does not load the actuator, the elastic element forms a gap between the second gear and the housing.

10. The actuator assembly according to claim 9, wherein the actuator comprises an electro-mechanical (EM) actuator.

11. The actuator assembly according to claim 9, wherein the screw shaft is externally threaded and the nut is internally threaded.

12. The actuator assembly according to claim 9, further comprising one or more bearings supportively interposed between the housing and the screw shaft.

13. The actuator assembly according to claim 9, wherein the cowl door opens by the actuator driving the cowl door extension and the actuator drives the cowl door retraction until the HOR supports the cowl door.

14. The actuator assembly according to claim 9, wherein the clutch assembly is configured such that a capability of the actuator to drive the cowl door retraction when the HOR supports the cowl door is limited to a preload level of the clutch assembly.

* * * * *